UNITED STATES PATENT OFFICE.

WILLIAM MORRISON, OF DES MOINES, IOWA.

NEGATIVE-POLE PLATE FOR ALKALINE STORAGE BATTERIES.

1,139,213.  Specification of Letters Patent.  Patented May 11, 1915.

No Drawing.  Application filed August 6, 1913. Serial No. 783,428.

*To all whom it may concern:*

Be it known that I, WILLIAM MORRISON, a citizen of the United States, residing at Des Moines, in the county of Polk and State of Iowa, have invented certain new and useful Improvements in Negative-Pole Plates for Alkaline Storage Batteries, of which the following is a specification.

My invention relates to improvements in alkaline storage batteries in which zinc constitutes the active element of the negative pole plate; and in which the zinc is present in combination with titanium, as hereinafter described.

To produce my electrode, I first obtain a precipitate as follows:—A soluble salt of zinc, such as the sulfate, chlorid, nitrate, etc., is dissolved in water. A soluble titanium compound, such as sodium or potassium titanate, is dissolved in a separate quantity of water; the titanium compound solution is then poured into the zinc salt solution until there is no further precipitation, and a slight excess of titanium compound solution has been added. The precipitation may be effected either with hot or cold solutions. The precipitate is suitably collected, dried, and then pressed into or onto a suitable grid or other conductor, which is insoluble in the electrolyte used; the electrode thus prepared is then put into an alkaline solution, electrically connected as a negative pole electrode in circuit with any suitable opposite electrode, and charged with a current until sufficiently reduced. The reduced zinc-titanium electrode is now discharged in an alkaline electrolyte preferably containing a soluble titanate, either by passing a current in the reverse direction to a suitable electrode or by short-circuiting it with a more electronegative electrode, in which latter case the combined electrodes act as an electric battery. This charging and discharging may be repeated once, but preferably a number of times, until a permanently insoluble zinc-titanium compound is obtained in the electrode. The zinc-titanium compound is not re-oxidized to the original titanate when the battery is discharged.

The precipitate above referred to, produced by adding a titanium compound solution to the zinc solution, may before it is pressed into the grid, have either metallic mercury or a mercury compound added thereto, and both thoroughly ground together. The mercury does not act as the active material in the electrode but serves to increase the conductivity of the mass, and further to hold the charge in the electrode. The mercury may also be added either by adding metallic mercury or a compound of mercury upon the surface of the charged electrode; in the latter case, the reduced electrode will reduce the moist mercury compound. When finally prepared, these negative-pole electrodes are ready for assembling with other suitable positive-pole electrode or electrodes for storage batteries.

In the claims, the expression "titanium and another metal"; "a compound of zinc and titanium"; "a substance containing a zinc-titanium-oxygen compound," etc., are intended to describe the condition of the electrode at different stages of charge or discharge; it being well known that the chemical composition of an electrode differs at these different stages.

I claim:—

1. The process of producing a compound for use in reversible alkaline batteries, which comprises electrolytically reducing a compound containing zinc and titanium in the presence of an alkaline electrolyte.

2. The process of producing a compound for use in reversible alkaline batteries, which comprises electrolytically reducing a mixture containing a zinc-titanium compound and a substance containing mercury in the presence of an alkaline electrolyte.

3. The process of making electrodes for use in reversible alkaline batteries, which comprises combining a zinc compound with a titanium compound, thereby forming a zinc-titanium compound, collecting the said zinc-titanium compound and applying it to a support for a battery electrode.

4. The process of making electrodes for use in reversible alkaline batteries, which comprises mixing solutions containing a zinc compound and a titanium compound, thereby forming a zinc-titanium compound, mixing said zinc-titanium compound with a substance containing mercury and applying said mixed mass to a support for a battery electrode.

5. The process of making electrodes for use in reversible alkaline batteries, which comprises mixing solutions of a zinc salt and of a soluble titanate, thereby forming an insoluble zinc-titanium compound, collecting said compound and applying it to a support for a battery electrode.

6. In a negative-pole electrode, a substance containing titanium and another metal or metals.

7. In a negative-pole electrode, a substance containing a compound of titanium and another metal or metals.

8. In a negative-pole electrode, a substance containing titanium and another oxidizable metal or metals.

9. In a negative-pole electrode, a compound of zinc and titanium.

10. In a negative-pole electrode, a substance containing a compound of zinc and titanium.

11. In a negative-pole electrode, a substance containing a zinc-titanium-oxygen compound.

12. In a reversible alkaline battery, a negative-pole electrode containing an oxidizable metal and a titanium compound.

13. In a reversible alkaline battery, a negative-pole electrode containing an oxidizable metal and a titanium-oxygen compound.

14. In a reversible alkaline battery, a negative-pole electrode containing zinc and a titanium compound.

15. In a reversible alkaline battery, a negative-pole electrode containing zinc, and a titanium-oxygen compound.

16. In a reversible alkaline battery, a negative-pole electrode containing zinc, a titanium-oxygen compound, and mercury.

In testimony whereof I affix my signature in presence of two witnesses.

WILLIAM MORRISON.

Witnesses:
JOSEPH W. HARRIS,
C. W. FOWLER.